United States Patent [19]

Bernard

[11] Patent Number: 4,986,953

[45] Date of Patent: Jan. 22, 1991

[54] DEVICE FOR THE SUPPORT AND POSITIONING OF MEANS FOR CHECKING AND TOOLS FOR WORKING ON FUEL ASSEMBLIES

[75] Inventor: Gebelin Bernard, Tassin la Demi-Lune, France

[73] Assignees: Framatome, Courbevoie; Cogema, Velizy Villacoublay, both of France

[21] Appl. No.: 458,472

[22] Filed: Dec. 28, 1989

[30] Foreign Application Priority Data

Dec. 28, 1988 [FR] France ............................. 88 17346

[51] Int. Cl.$^5$ ............................................. G21C 1706
[52] U.S. Cl. ..................................... 376/245; 376/248
[58] Field of Search ............... 376/260, 270, 245, 248; 212/260, 211; 114/222

[56] References Cited

U.S. PATENT DOCUMENTS

| 4,483,205 | 11/1984 | Bellaiche et al. | 376/245 |
| 4,664,873 | 5/1987 | Hendrich et al. | 376/260 |
| 4,683,109 | 7/1987 | Cooper, Jr. et al. | 376/245 |
| 4,813,313 | 3/1989 | Ichikawa et al. | 376/260 |

FOREIGN PATENT DOCUMENTS

| 0059301 | 9/1982 | European Pat. Off. |
| 0192406 | 8/1986 | European Pat. Off. |
| 2525799 | 10/1983 | France |

Primary Examiner—Daniel D. Wasil
Attorney, Agent, or Firm—Pollock, Vande Sande & Priddy

[57] ABSTRACT

The device comprises a control station (2) fixed on the edge of the pool (3), a rod (4) connected to the support of the control station (2) at its upper end (5), means for adjusting the inclination of the rod (4) relative to the vertical direction, a tool support (12) and an assembly for displacing the tool support (12) in two directions perpendicular to the axis of the rod (4), carried by the carriage (10). Control means (14, 15) may be activated from the control station (2) in order to displace the tool support (12) by means of the displacement assembly.

12 Claims, 4 Drawing Sheets

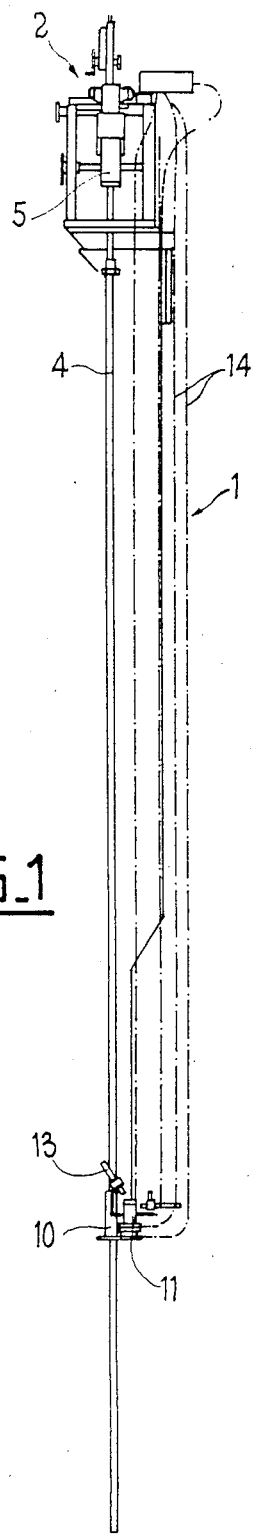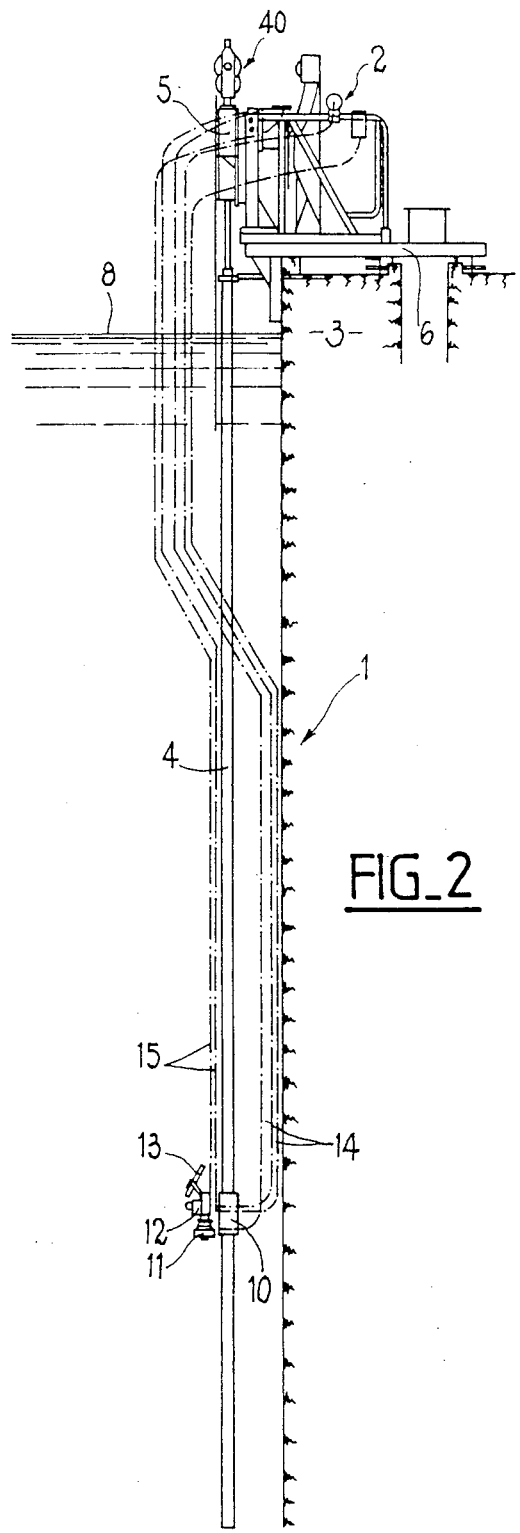

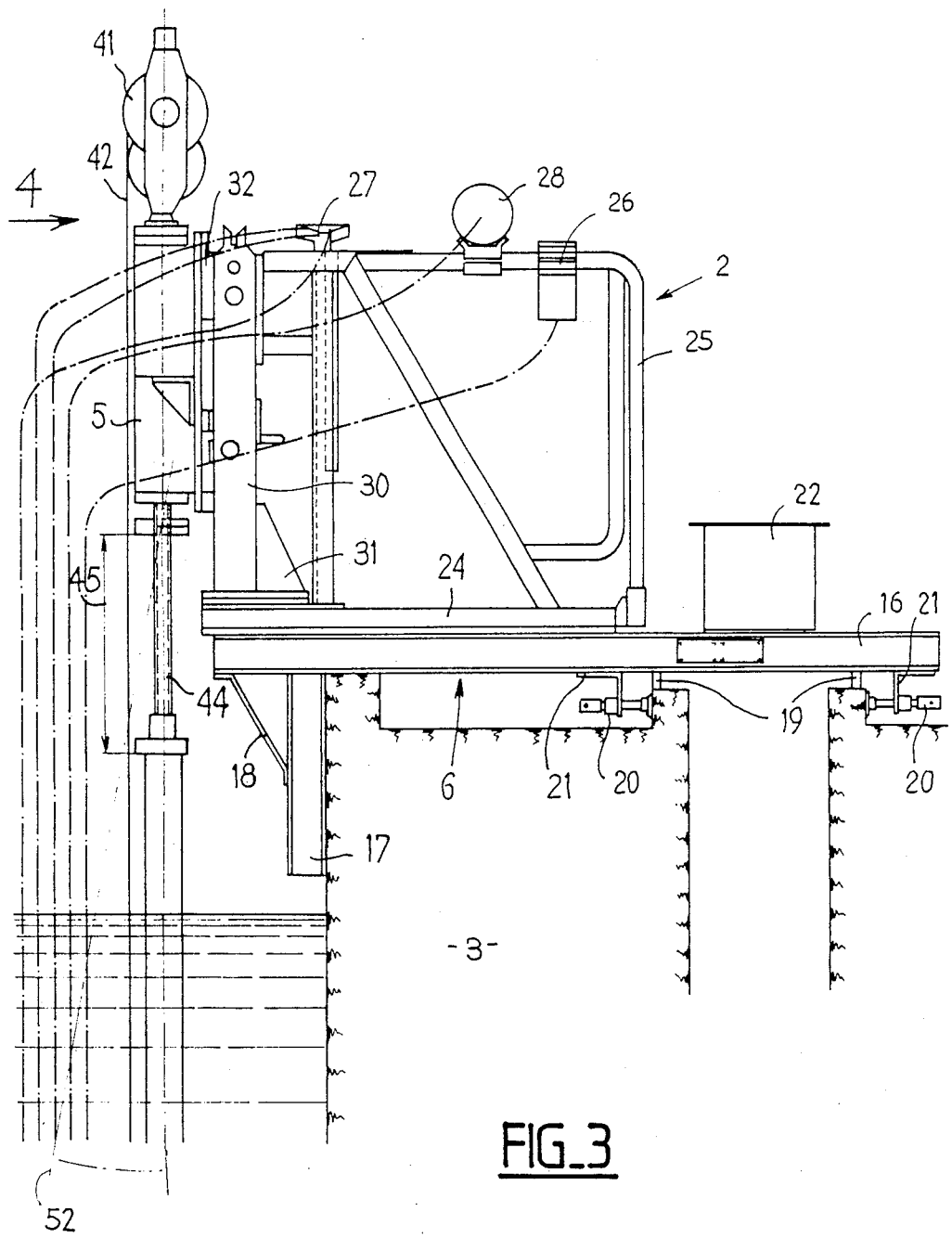
FIG_3

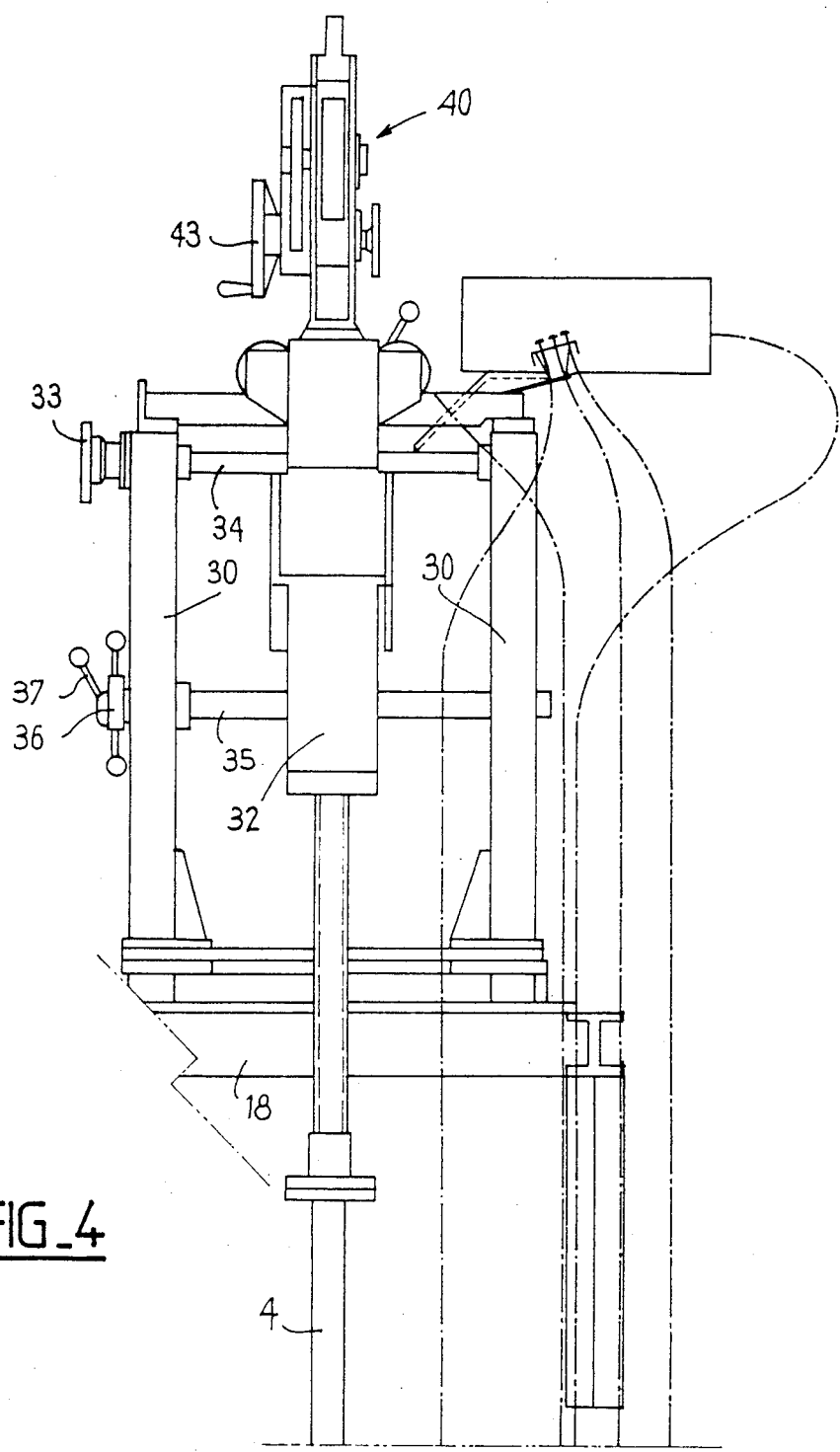
FIG_4

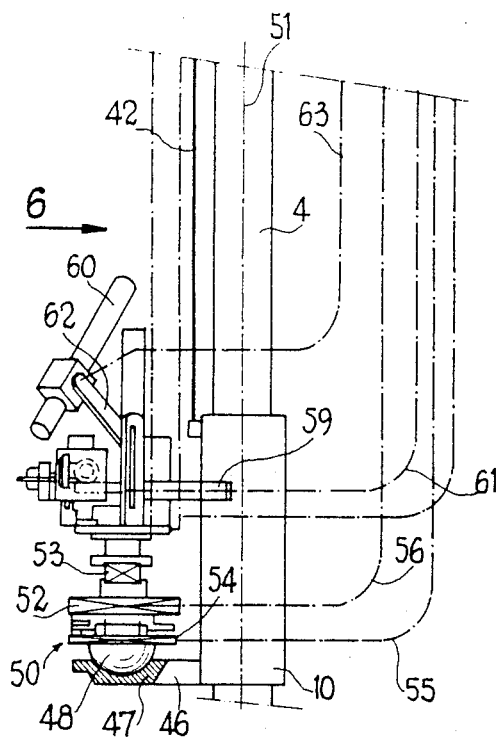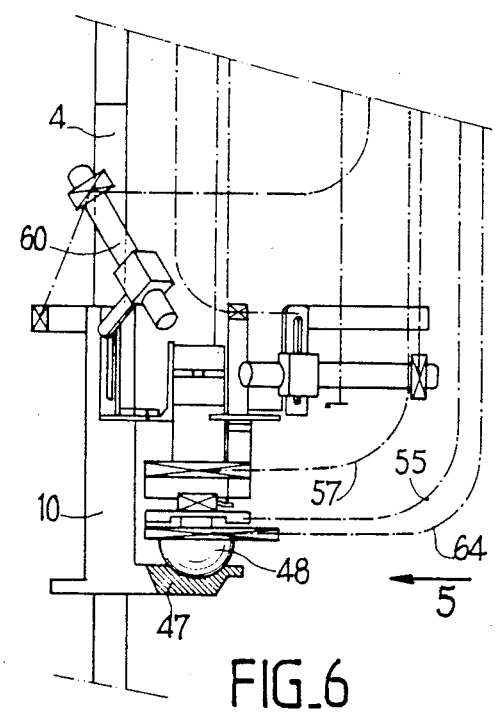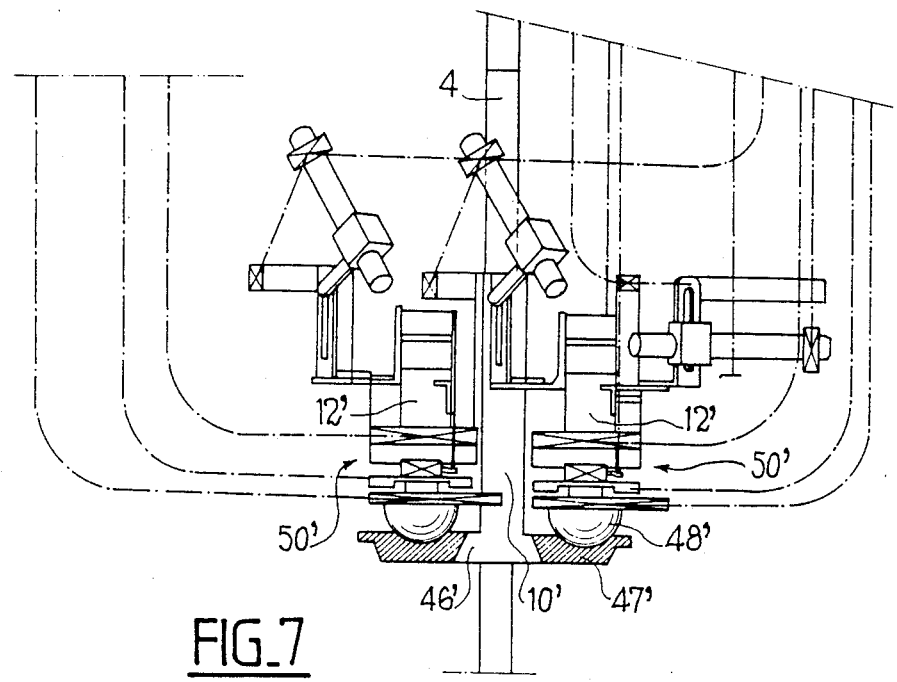

DEVICE FOR THE SUPPORT AND POSITIONING OF MEANS FOR CHECKING AND TOOLS FOR WORKING ON FUEL ASSEMBLIES

The invention relates to a device for the support and positioning of means for checking and tools for working on fuel assemblies of a water nuclear reactor which are immersed in a pool.

After a certain time of operation in the reactor, the fuel assemblies constituting the core of a reactor require examinations and checks in order to ensure that these assemblies have not suffered damage preventing their subsequent use in the core of the reactor. Dimensional checks may be performed in order to confirm the characteristics of an assembly after irradiation.

If certain defects have been detected, it may be possible to perform certain repairs or certain work operations which make it possible to reuse the fuel assembly for refuelling the core of the reactor.

These checking operations using visual means or a probe as well as the implementation of tools for working on the fuel assembly must be performed under a certain depth of water in the region of the minimum biological protection requirement of 3 metres, or slightly more, of water. These operations are performed in a pool where the assembly, whose height is in the region of 4 metres, is placed in a vertical position.

These checks or work operations may thus be performed, in certain cases, under a depth of water which is far greater than 3 metres and in any position according to the height of the assembly.

Among the work operations envisaged or in respect of which tools have already been designed, it is possible to mention the removal of foreign bodies or particles inside the fuel assembly, the straightening of the fins of the grids of fuel assemblies, the checking of the sliding of the fuel pencils in their structure and the removal of pieces of peripheral rods in the assembly which have suffered a breakage.

In all cases, it is necessary to set in place visual checking means and a tool for working at a very precise location situated in the vicinity of the fuel assembly. It must also be possible to adjust, remotely and accurately and using a simple and rapid procedure, the positioning and the orientation of the work tool.

No device was known hitherto which made it possible to perform the installation and accurate positioning of means for checking and tools for working on fuel assemblies immersed in a storage pool.

The invention thus aims to propose a device for the support and positioning of means for checking and tools for working on fuel assemblies of a water nuclear reactor which are immersed in a pool under a certain depth of water, it being possible for this device to be implemented simply and rapidly, making it possible to obtain an extremely precise positioning of the means for checking and the work tools.

To this end, the device according to the invention comprises:

a control station having a support fixed on the edge of the pool, a rod of great length connected to the support of the control station at its upper end and disposed in a substantially vertical position inside the pool so as to present a part located opposite at least one fuel assembly disposed inside the pool, means for adjusting the inclination of the rod relative to the vertical direction and for immobilizing the rod in at least one inclined position, which means are fixed on the support of the control station, a carriage mounted so as to be movable along the length of the rod interacting with guide means carried by the rod, means for displacing the carriage which are controlled from the control station, at least one tool support intended to receive at least one means for checking and at least one work tool, an assembly for displacing the tool support in two different directions perpendicular to the axis of the rod, carried by the carriage, means for controlling the displacements of the tool support which can be activated from the control station, and means for controlling the work tool and the means for checking from the control station.

In order to make the invention understandable, a description will now be given by way of non-limiting example with reference to the appended attached figures of an embodiment of a device for support and positioning according to the invention.

FIG. 1 is a front view in elevation of the assembly of the device for support and positioning according to the invention.

FIG. 2 is a side view showing the assembly of the device for support and positioning in a storage pool for fuel assemblies.

FIG. 3 is a side view of the control station of the device shown in FIGS. 1 and 2.

FIG. 4 is a front view of the control station, according to 4 of FIG. 3.

FIG. 5 is a front view of the assembly for displacing the tool support, according to 5 in FIG. 6.

FIG. 6 is a side view of the assembly for displacing the tool support, according to 6 in FIG. 5.

FIG. 7 is a front view of an alternative embodiment of the assembly for displacing the tool support.

FIGS. 1 and 2 show the assembly of the device denoted generally by the reference 1.

The device comprises a control station 2 fixed on the upper edge of a wall 3 of the pool and a rod 4 of great length connected at its upper part 5 to the support 6 of the control station 2.

In an operating position, the rod 4 is immersed beneath the level 8 of the water in the pool and has a height which is sufficient to accommodate opposite a part of a fuel assembly disposed vertically on a support resting on the bottom of the pool.

A carriage 10 is mounted so as to move in the axial direction of the rod 4 which guides the carriage during its displacements.

The carriage 10 carries an assembly 11 for displacing, in two directions perpendicular to the axis of the rod 4, a support 12 on which are fixed visual checking means 13, such as video cameras and a tool for working on the fuel assembly.

The displacement assembly 11, the visual checking means (13) and the work tool may be controlled remotely, from the control station 2, by virtue of remote controls 14, 15 which may consist of ball remote controls with rapid displacement and with micrometric displacement.

Ball remote controls of this type comprise a sheath inside which an elongated activating element which is rigid in the direction of thrust and deformable on flexion is mounted so as to slide by means of balls.

A rapid control handle and a device for micrometric displacement are connected to one end of the elongated element, which handle is located at the control station. An operator may act remotely by pushing or pulling on the handle or by activating the micrometric device from the control station 2.

FIGS. 3 and 4 show the assembly of the control station 2 whose support 6 consists of a mechanically welded base 16 resting on the upper part of the wall 3 of the pool and comprises vertical support lugs 17 consisting of profiles connected to the base 16 by reinforcing brackets 18.

At its rear part, the base 16 rests on the wall 3 of the pool by means of support devices 19 which may be adjusted in respect of height.

Mechanical jacks 20, fixed on the base 16 by means of brackets 21, make it possible to fix the control station 2 on the wall 3 of the pool in a rigid and totally stable manner.

Moreover, the base 6 carries, at its rear part, a vessel 22 filled with a high-density material, such as lead, which makes it possible to balance the tilting moment exerted on the support 6 of the control station if significant forces are exerted on the support 12, these forces being taken up by the support 6 of the control station by means of the rod 4.

The position of the vessel 22 on the base 16 may be adjusted in order to modify the balance moment. The base 16 of the support 6 carries a platform 24 comprising a railing 25 on which are fixed the control handles 26 for the ball remote controls, such as 14 and 15, various adjusting levers and indicator lights 27 and a force and displacement controller 28, such that an operator located on the platform 24 can position the tool and the means for checking and monitor and control the work tool. Video screens located near the platform permanently provide the operator with an image of the work zone by virtue of the video cameras, such as the camera 13.

At its front part, the platform 24 carries a support 30 consisting of two vertical columns rigidly fixed to the platform by means of brackets 31.

The top part 5 of the rod 4 comprises a fixing part 32 directed towards the platform 24 and disposed between the columns of the vertical support 30. The rod 4 is connected to the support 30 by means of the fixing part 32 rigidly connected to the upper part 5 of the rod.

A screw 34 is mounted transversely and is movable in rotation between the columns of the support 30. A wheel 33 which is integrally attached to the end of the screw 34 may be activated manually by the operator from the platform 24.

The fixing part 32 for the rod 4 comprises a nut engaged on the screw 34. Rotation of the wheel 33 in one direction or another thus makes it possible to displace the fixing part 32 and the assembly of the rod 4 in a transverse direction parallel to the wall 3 of the pool.

A shaft 35 is also mounted transversely and so as to move in rotation between the columns of the support 30, below the screw 34 and in a position parallel to this screw.

A handle 36 which is integrally attached to the end of the shaft 35 makes it possible to rotate this shaft in one direction or another, by means of a manual action on the part of the operator from the platform of the control station.

A ratchet immobilizing device 37 is associated with the handle 36 and makes it possible to immobilize the shaft 35 in rotation in a specific position. A cam mounted on the shaft 35 rests in a cavity of the fixing part 32 of the rod 4 so as to vary the inclination of the rod 4 relative to the vertical direction by rotating the handle 36. The cam is mounted so as to be integral in rotation with the shaft 32 and so as to slide on this shaft, in the transverse direction, by means of a set of corresponding channels and grooves.

The ratchet immobilizing device 37 makes it possible to fix the inclination of the rod 4 after a displacement due to tilting through the action of the cam driven by the shaft 35 resting on the fixing part 32.

It is thus possible to place the rod 4 very rapidly in a position which is inclined relative to the vertical, such as the position represented by the axis 52 in FIG. 3.

The upper part 5 of the rod 4 carries a winch 40 comprising a pulley 41, over which passes a cable 42, and a manoeuvring wheel 43 driving the pulley 41 in rotation by means of a gear.

The operator may use the handle of the manoeuvring wheel 43 in order to rotate it in one direction or another in order to drive the pulley 41 and to displace the cable 42 either upwards or downwards.

The cable 42 is connected, at its lower part, to a fixing lug of the carriage 10 so that this carriage 10 may be displaced along the length of the rod 4 by means of a simple manual action from the control station.

The carriage 4 comprises guide shoes interacting with rails disposed along the length of the rod 4.

The displacement of the carriage 10 makes it possible to adjust the position of the tool support 12 along the height of the assembly.

The displacement of the carriage 10 on the rod 4 makes it possible rapidly to reach the work zone of the tool on the fuel assembly but does not make it possible to accurately adjust this position.

A screw device 44 makes it possible to displace the rod 4, at slow speed, relative to its upper part 5 over a path 45 whose length may be of the order of 600 mm. Thus it is possible to obtain very accurate positioning of the tool support 12 along the height of the assembly.

FIGS. 5 and 6 show the carriage 10 mounted so as to slide on the rod 4 in the axial direction and supporting, by means of position-adjusting means, which will be described hereinbelow, the tool support 12.

At its lower part, the carriage 10 comprises an arm 46 forming a pivoting bearing 47 at its end.

The tool support 12 is carried by the arm 46 by means of a ball 48 mounted so as to pivot in the bearing 47 and a displacement assembly 50 comprising carriages which can be displaced in two directions perpendicular to one another and perpendicular to the axis 51 of the rod 4.

The assembly 50 comprises a first carriage 52 or lower carriage which is movable in slides resting on the ball 48 by means of a rotational displacement device 54 which makes it possible to adjust the orientation of the crossed carriage assembly 50 and of the support 12 about the axis of the ball 48. The orientation device 54 may be controlled by means of a ball remote control 55 whose end opposite to the end connected to the orientation device 54 is located at the control station.

The lower carriage 52 carries rails for guiding an upper carriage 53, these guide rails being directed in a direction perpendicular to the direction of the rails for guiding the lower carriage 52.

The direction of the rails for guiding the carriage 52 corresponds to a direction which is substantially perpendicular to the wall 3 of the pool, whereas the direction of the rails for guiding the upper carriage 53 corresponds substantially to a direction which is parallel to the wall 3.

The displacements of the carriages 52 and 53 are controlled by ball remote controls 56 and 57, respectively.

The support 12 carries a work tool 59 and an assembly of video cameras such as 60.

The work tool 59 may be activated by virtue of a ball remote control 61.

The inclination of the camera 60 on its support arm 62 may be adjusted by virtue of a ball remote control 63.

The device according to the invention thus makes it possible to adjust or preadjust the position of the tool support in a very accurate manner, with very numerous possibilities of displacement and inclination.

It is thus possible to use work tools in very diverse positions and for extremely varied tasks.

The rapid movements for approaching and positioning the tool support may be obtained by displacing the carriage by virtue of the winch 40 and by tilting the rod 4 in an inclined position about the axis formed by the screw 34.

An accurate positioning of the tool support in respect of height may then be obtained by displacing the rod, at slow speed, in the vertical direction by virtue of the screw device 44.

The accurate positioning of the tool support in horizontal directions may be obtained by virtue of the orientation device 54 and by virtue of the crossed carriage assembly 50.

The pivoting mounting of the crossed carriage assembly makes it possible to ensure that the carriages are displaced in perfectly horizontal directions.

When a correct position is ensured, the ball is immobilized in position by virtue of a remote control 64.

FIG. 7 shows an alternative embodiment of the device according to the invention in which the carriage 10' carries, by means of two arms 46', two crossed carriage assemblies 50' which are independent and located on either side of the carriage 10' and of the rod 4.

The mounting of each of the crossed carriage assemblies 50' is identical to the mounting of the crossed carriage assemblies 50 which was described hereinabove.

Each of the crossed carriage assemblies 50' carries a tool support 12' whose positioning relative to the fuel assembly may be achieved independently of the second tool support.

A device as represented in FIG. 7 may be used to perform several different successive operations on the assembly without having to change the tool.

For example, a tool which makes it possible to commence an operation, for example the straightening of a guide fin of the fuel assembly, will be mounted on one of the tool supports, and on the other tool support 12' will be mounted a second tool which makes it possible to finish an operation, for example which makes it possible to place a guide fin in its correct inclination position.

It is also possible to imagine other arrangements which make it possible to perform more or less independent displacements of at least two tool supports. For example, it is possible to imagine the pivoting mounting of a first carriage with transverse displacement on which are mounted two upper carriages with longitudinal displacement which may be controlled simultaneously or independently depending on the different work operations to be performed.

The two longitudinal carriages may be connected together in order to be displaced simultaneously or, on the other hand, may be independent of one another. The crossed carriages may be disengaged in certain phases of the work operation.

It is seen that the advantages of the device according to the invention are to facilitate work operations and to reduce the duration thereof on fuel assemblies by permitting rapid, accurate and perfectly adapted positioning of the tool relative to the fuel assembly.

It is also possible to place the fuel assembly on which a work operation must be performed in a position which makes it possible to facilitate the work operation of the tool, depending on the possibilities of the support and positioning device. For example, it is possible to place the fuel assembly or any other irradiated material on which it is desired to perform a work operation on a support of a height such that the work operation takes place at the minimum height ensuring biological protection of the operators.

It is also possible to envisage work operations on an assembly suspended from the hook of the sliding platform of the pool where the work operation takes place.

It is also possible to imagine equipping the device according to the invention with motorization means to replace the ball remote controls or other manual-type remote controls.

It is then possible to control the motorization means remotely in order to obtain independent or simultaneous displacements of the various movable elements of the device. It is also possible to program the displacements of the crossed carriage assembly in order to perform repetitive work operations.

The device according to the invention may be used for performing visual examinations of assemblies by virtue of video cameras, in order to perform dimensional checks or any type of control using probes with eddy current or ultrasound.

The device according to the invention may also be used to perform work operations requiring the implementation of various tools during operations for maintenance and repair of fuel assemblies before the latter are used to refuel the core of the reactor.

What is claimed is:
1. Device for the support and positioning of means for checking and tools for working on fuel assemblies of a water nuclear reactor which are immersed in a pool under a certain depth of water, characterized in that it comprises:
   a control station (2) having a support (6) fixed on the edge (3) of the pool,
   a rod (4) connected to the support of the control station at its upper end (5) and disposed in a substantially vertical position inside the pool so as to present a part located opposite at least one fuel assembly disposed inside the pool,
   means (35, 36) for adjusting the inclination of the rod (4) relative to the vertical direction and for immobilizing the rod in at least one inclined position, which means are fixed on the support (6) of the control station (2),
   a carriage (10) mounted so as to be movable along the length of the rod (4) interacting with guide means carried by the rod (4),
   means (40, 41, 42, 43) for displacing the carriage (10) which are controlled from the control station (2), at least one tool support (12) intended to receive at least one means for checking (13) and at least one work tool (59), an assembly (50) for displacing the tool support (12) in two different directions perpendicular to the axis of the rod (4), carried by the carriage (10), means (56, 57) for controlling the displacements of the tool support (50) which can be activated from the control station (2), and means (61, 63) for controlling the means (60) for checking and the tool (59) from the control station (2).

2. Device according to claim 1, characterized in that the support (6) of the control station (2) comprises a vertical structure (30) in which is mounted so as to move in rotation a horizontal screw (34), and in that the upper part (5) of the rod (4) comprises a fixing part (32) presenting a nut engaged on the screw (34) so as to interact with this screw (34) in order to ensure the displacement of the rod in a horizontal direction which is substantially parallel to the edge of the pool (3) by rotating the screw (34) in one direction or another.

3. Device according to claim 2, characterized in that a shaft (35) parallel to the screw (34) is situated below this screw and mounted so as to move in rotation in the vertical support (30), the shaft (35) being integrally attached in rotation to a cam resting on the fixing part (32) of the rod (4) in order to ensure the rotational inclination of the rod (4) about the screw (34), the cam being activated by rotation of the shaft (35) in one direction or another.

4. Device according to claim 1, characterized in that the means for displacing the carriage consists of a winch (40) fixed on the upper part (5) of the rod (4) comprising a cable (42) wound on a drive pulley (41) whose end opposite to the pulley (41) is connected to the carriage (10).

5. Device according to claim 1, characterized in that it also comprises a screw device (44) for adjusting the vertical position of the rod (4).

6. Device according to claim 1, characterized in that the assembly (50) for displacing the tool support (12) in two directions perpendicular to the axis of the rod (4) consists of a carriage device with crossed displacements in two perpendicular directions.

7. Device according to claim 6, characterized in that the carriage with crossed displacements comprises two carriages with longitudinal displacement which form the tool support and which can be connected in order to be displaced simultaneously or, on the other hand, can be independent.

8. Device according to claim 7, characterized in that at least one of the carriages may be disengaged during certain phases the work operation.

9. Device according to claim 6, characterized in that the carriage assembly (50) with crossed displacements is carried by the carriage (10) which is movable along the axial direction of the rod (4) by means of a pivoting assembly (47, 48).

10. Device according to claim 9, characterized in that the pivoting assembly (47, 48) comprises a device (54) for adjusting and immobilizing which can be activated remotely.

11. Device according to claim 1, characterized in that the means for controlling the displacements of the tool support (12) and the means for controlling the tool and the means for checking from the control station (2) consist of ball remote controls.

12. Device according to claim 1, characterized in that the control station (2) consists of a support (6) on which is mounted a platform (24) and a support (30) for the upper end (5) of the rod (4), the assembly of the control means being accessible to an operator from the platform (24).

* * * * *